United States Patent
Brethour et al.

(10) Patent No.: US 7,400,666 B2
(45) Date of Patent: Jul. 15, 2008

(54) METHOD FOR GENERATING COMMUNICATION SIGNAL SEQUENCES HAVING DESIRABLE CORRELATION PROPERTIES AND SYSTEM FOR USING GAME

(75) Inventors: Vernon R. Brethour, Owens Cross Roads, AL (US); Larry W. Fullerton, Brownsboro, AL (US); Marcus H. Pendergrass, Huntsville, AL (US); James L. Richards, Fayetteville, TN (US)

(73) Assignee: Alereon, Inc., Austin, TX (US)

( * ) Notice: Subject to any disclaimer, the term of this patent is extended or adjusted under 35 U.S.C. 154(b) by 633 days.

(21) Appl. No.: 10/616,118

(22) Filed: Jul. 9, 2003

(65) Prior Publication Data

US 2005/0117628 A1    Jun. 2, 2005

Related U.S. Application Data

(60) Provisional application No. 60/402,819, filed on Aug. 12, 2002.

(51) Int. Cl.
*H04B 1/69* (2006.01)
(52) U.S. Cl. .................. 375/130; 375/132; 375/146; 375/150; 375/295
(58) Field of Classification Search ......... 375/146–150, 375/130, 132–133, 142, 295, 13, 316, 343, 375/248, 242, 239; 370/335, 342, 320, 441, 370/321, 347
See application file for complete search history.

(56) References Cited

U.S. PATENT DOCUMENTS

| | | | | |
|---|---|---|---|---|
| 5,353,303 A | * | 10/1994 | Walthall | 375/145 |
| 5,450,395 A | * | 9/1995 | Hostetter et al. | 370/320 |
| 5,610,907 A | * | 3/1997 | Barrett | 370/342 |
| 5,677,927 A | * | 10/1997 | Fullerton et al. | 375/130 |
| 6,618,430 B1 | * | 9/2003 | Khaleghi et al. | 375/147 |
| 6,636,566 B1 | * | 10/2003 | Roberts et al. | 375/247 |
| 6,788,730 B1 | * | 9/2004 | Richards et al. | 375/138 |
| 6,912,240 B2 | * | 6/2005 | Kumar et al. | 375/130 |
| 6,937,639 B2 | * | 8/2005 | Pendergrass et al. | 375/135 |
| 6,959,032 B1 | * | 10/2005 | Richards et al. | 375/138 |
| 7,145,954 B1 | * | 12/2006 | Pendergrass et al. | 375/247 |
| 7,280,615 B2 | * | 10/2007 | Roberts | 375/316 |
| 2003/0161411 A1 | * | 8/2003 | McCorkle et al. | 375/295 |

FOREIGN PATENT DOCUMENTS

WO    WO 01/93441 A1    12/2001

OTHER PUBLICATIONS

Hwang et al., "Asynchronous Multirate Optical Wireless PPM-CDMA in an Indoor Non-Directed Diffuse Channel," 33:18, Aug. 28, 1997.
International Search Report for Application No. PCT/US03/24816, Jan. 8, 2004.

* cited by examiner

*Primary Examiner*—Mohammad H. Ghayour
*Assistant Examiner*—Sophia Vlahos
(74) *Attorney, Agent, or Firm*—Sprinkle IP Law Group

(57) ABSTRACT

A method for generating code sequences having good correlation properties comprising steps of selecting a code length comprising a number of chips, selecting a ruler which defines the position of non-zero values within the chips, and overlaying the non-zero values with an amplitude pattern.

14 Claims, 10 Drawing Sheets

Amplitude pattern = { + , - , + , - }

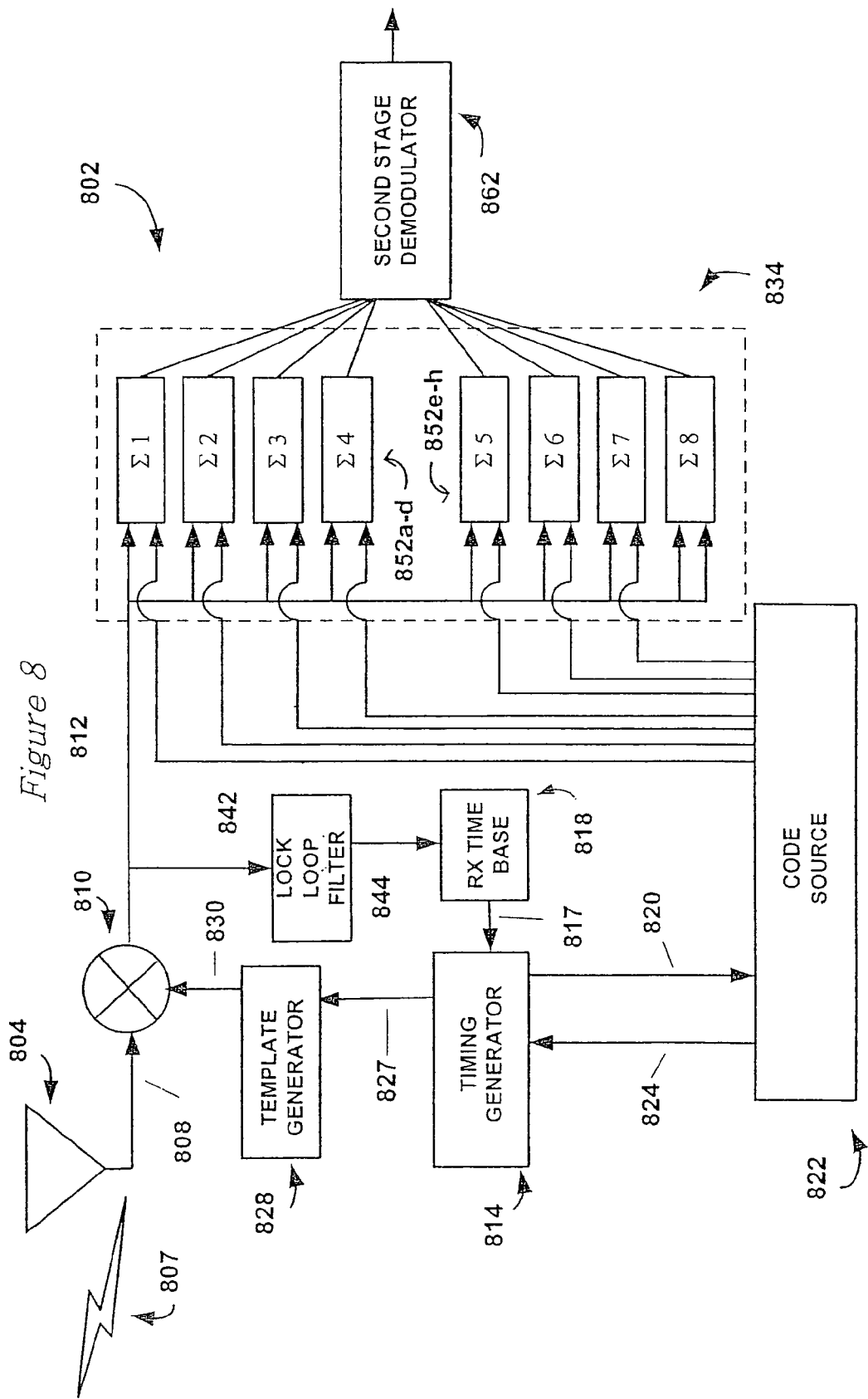

METHOD FOR GENERATING COMMUNICATION SIGNAL SEQUENCES HAVING DESIRABLE CORRELATION PROPERTIES AND SYSTEM FOR USING GAME

CROSS-REFERENCE TO RELATED APPLICATIONS

This application claims priority of U.S. Provisional Application No. 60/402,819, filed Aug. 12, 2002.

Furthermore, the following co-owned and co-pending applications may contain common disclosure with the present application:

U.S. patent application Ser. No. 09/638,192 entitled "A METHOD FOR SPECIFYING NON-TEMPORAL PULSE CHARACTERISTICS", filed on Aug. 15, 2000.

U.S. patent application Ser. No. 09/638,046 entitled "A METHOD AND APPARATUS FOR APPLYING CODES HAVING PREDEFINED PROPERTIES", filed on Aug. 15, 2000.

U.S. patent application Ser. No. 09/637,878 entitled "A METHOD AND APPARATUS FOR POSITIONING PULSES USING A LAYOUT HAVING NON-ALLOWABLE REGIONS", filed on Aug. 15, 2000.

U.S. patent application Ser. No. 09/638,150 entitled "A METHOD AND APPARATUS FOR POSITIONING PULSES IN TIME", filed on Aug. 15, 2000.

U.S. patent application Ser. No. 09/638,151 entitled "A METHOD AND APPARATUS FOR MAPPING PULSES TO A NON-FIXED LAYOUT", filed on Aug. 15, 2000.

U.S. patent application Ser. No. 09/638,152 entitled "A METHOD AND APPARATUS FOR SPECIFYING PULSE CHARACTERISTICS USING CODE THAT SATISFIES PREDEFINED CRITERIA", filed on Aug. 15, 2000.

U.S. patent application Ser. No. 09/638,153 entitled "A METHOD FOR SPECIFYING PULSE CHARACTERISTICS USING CODES", filed on Aug. 15, 2000.

U.S. patent application Ser. No. 09/638,154 entitled "A METHOD FOR SPECIFYING NON-ALLOWABLE PULSE CHARACTERISTICS", filed on Aug. 15, 2000.

U.S. patent application Ser. No. 09/708,025 entitled "A METHOD AND APPARATUS FOR GENERATING A PULSE TRAIN WITH SPECIFIABLE SPECTRAL RESPONSE CHARACTERISTICS", filed on Nov. 8, 2000.

The above-listed applications are incorporated herein by reference in their entireties.

BACKGROUND

As the communication bandwidth in the crowded frequency spectrum becomes an increasingly scarce and valuable commodity, significant efforts are being applied to devise methods that enable more efficient use of available bandwidth. At the same time, demand for greater data transfer rates via both wireless and wired connections increases at a rate that tends to out-pace the state of the art.

Transmission of data at a high rate in radio communication has been plagued by problems of multipath interference and mutual interference. Multipath interference occurs when a signal interferes with reflected versions of itself. Mutual interference occurs when a signal is interfered with by a signal from a different transmitter.

Attempts to increase the number of concurrent users (channelization) include well-known techniques of Code Division Multiple Access (CDMA), Time Division Multiple Access (TDMA) and Frequency Division Multiple Access. Various coding techniques have been used in these access techniques to accommodate multiple users by permitting them to use the same frequency bandwidth at the same time. For example, conventional spread-spectrum code division multiple access (SS-CDMA), or direct sequence CDMA systems, employ pseudo-noise (PN) codeword generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled "Spread-Spectrum Multiple Access Communication System Using Satellite or Terrestrial Repeaters" by Gilbousen et al.

Dent et al. in U.S. Pat. No. 5,353,352 disclose a multiple access coding technique for radio communications, such as cellular systems, in which individual information signals are encoded with a common block error-correction code. The information signals are assigned a unique scrambling mask, or signature sequence, taken from a set of scrambling masks having selected correlation properties. The set of scrambling masks is selected such that the correlation between the modulo-2 sum of two masks with any codeword in the block code is a constant magnitude, independent of the mask set and the individual masks being compared. In one embodiment, when any two masks are summed using modulo-2 arithmetic, the Walsh transformation of that sum results in a maximally flat Walsh spectrum.

Awater et al. in U.S. Pat. No. 5,862,182 disclose enhancing encoding/transmission of information in an OFDM Wireless Local Area Network (WLAN) system using complementary codes. The complementary codes are converted into phase vectors and the resulting phase vectors are then used to modulate respective carrier signals. The modulated result is then transmitted to a receiver which decodes the received signals to recover the encoded information.

Awater et al. in U.S. Pat. No. 6,005,840 disclose a combined complementary encoder and modulation WLAN system for an OFDM transmitter system that combines complementary coding and modulation and exploits the similarity of their mathematical structure to reduce implementation complexity. Additionally, the combined complementary encoder and modulation system can be modified to provide scalability, which allows a transmitter to operate in various transmission environments.

The above-described techniques typically experience degraded performance in severe multipath environments, unless significant processing measures are taken to mediate multipath effects. In addition, such systems experience a limited data rate. For example, such techniques are not optimal for wireless video communications.

Efforts to provide greater usable communications bandwidth without interference have led to the development of impulse radio techniques that use ultra wideband ("UWB") signals. Impulse radio systems were first described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

Unlike conventional spread-spectrum systems, impulse radio systems typically do not employ time-hopping codes for the purpose of energy spreading. This is because the monocycle pulses themselves have an inherently wide bandwidth. Instead, the impulse radio systems use the time-hopping codes primarily for channelization, energy smoothing in the frequency domain, and interference suppression.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hopping code should be steeply peaked, with small side-lobes. Maximally peaked time-hopping code autocorrelation perform best in channels with multipath as well as yielding optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

Specialized coding techniques can be employed to specify temporal and/or non-temporal pulse characteristics to produce a pulse train having certain spectral and/or correlation properties. As stated above, coding provides a method of establishing independent communication channels. Specifically, families of time-hopping codes can be designed such that the number of pulse coincidences between two pulse trains produced by any two codes will be no more than some maximum number (e.g., four), regardless of the time offset between the two pulse trains simultaneously arriving at an impulse radio receiver. Coding can also be used to facilitate signal acquisition. Specifically, coding techniques can be used to produce pulse trains with a desirable main-lobe-to-side-lobe ratio and to reduce acquisition algorithm search space.

A simple form of ultra wideband radio carries information in the relative time position of UWB impulses or in the polarity, i.e., initial direction of amplitude, of UWB impulses, or both. If it is desired to carry more information in a UWB channel, the obvious technique to try is to send the UWB impulses more often. However, if the impulses are sent with a time interval between pulses that is shorter than the impulse response of the multipath environment through which the pulses are traveling, the pulses interfere with each other at the receiver causing demodulation errors. Paradoxically, if it is attempted to send more information through a channel by sending pulses more often with less than a certain spacing of UWB impulses, the channel carries less information due to this self-jamming effect. This is the multipath problem.

The basic difficulty in the multipath problem comes from the interference of a signal and a time shifted copy of itself. The interfering copy of the signal is time shifted because it took a longer or shorter path from the transmitter to the receiver than the copy of signal we are trying to demodulate.

If it is desired to have several systems all on the air at the same time in an uncoordinated fashion, then signals from the different channels interfere with each other at a particular receiver and cause bit errors. This is similar to the multipath problem and again the paradox is that if it is attempted to move more total data through a particular space by putting more channels on the air, less data may actually be received due to this jamming effect. This is known as the channelization problem. The basic difficulty in the channelization problem comes from interference of a desired signal and signals being used by other channels.

Several well-known code methods produce code sequences that are orthogonal to one another, meaning that for a given code sequence, there would be a limited amount of correlation between it and a time-shifted copy of itself. Such methods include Barker codes, Kasami codes, Gold codes and Minimum side-lobe radar codes. While orthogonality of the code sequences produced by these methods is perhaps beneficial to signal acquisition in a mulitpath environment, such methods produced a limited number of codes of a given length. Thus, the number of channels using such codes is limited. Former attempts to increase channelization involved increasing the length of code sequences used. This provides an increased number of channels by providing an increased number of possible codes that can be used. However, the greater the length of the code, the greater the scan time required to acquire the signal.

Walsh-Hadamard codes have been investigated for use in this area. It is well known that Walsh-Hadamard codes display desirable correlation properties when aligned in time, having both perfect auto-correlation and cross-correlation values. However, when misaligned in time, auto-correlation properties are degraded.

Additionally, time-hopping codes used for modulating and demodulating data signals require timing mechanisms on both transmit and receive ends. Such mechanisms increase the complexity, cost and power usage of the device. Problems of signal acquisition and transmit/receive synchronization increase in complexity.

Thus, a novel communications code system is needed that can provide a set of short code sequences where the set of sequences provides improved channelization options in intense multipath environments for high data throughput operations.

SUMMARY

The present invention is directed to a method of generating code sequences that satisfies this need comprising the steps of selecting a code length, where the code length is comprised of a set of chips. The chips will have either a zero value or a non-zero value. Next, non-zero values are arrayed according to a ruler. In another embodiment of the invention, the ruler is orthogonal to itself.

According to another embodiment, the non-zero values may take on differing amplitudes, preferably positive or negative amplitudes, and still preferably according to an amplitude pattern.

Sets of code sequences may be generated using families of amplitude patterns, wherein each pattern within the family is orthogonal to any other pattern within the family. Further, a code sequence set may be generated using families of rulers wherein each ruler within the family is orthogonal to any other ruler within the family. Additionally, a set of code sequences generated according to the present invention may comprise a family of rulers and one amplitude pattern.

Further, sets of codes sequences may be generated for UWB impulse radio signals.

BRIEF DESCRIPTION OF THE DRAWINGS

These and other features, aspects, and advantages of the present invention will become better understood with regard to the description, appended claims, and accompanying drawings where:

FIG. 8 is a functional diagram of an exemplary impulse radio receiver.

DETAILED DESCRIPTION OF THE INVENTION

A communication signal sequence generated according to the present invention herein described carries information in two distinct ways: the arrangement of zero and non-zero entries in the code carries positional information, i.e. the position of the non-zero values within the sequence, while the sign pattern among the non-zero entries in the code carries the amplitude information. Carrying data in this fashion increases data throughput.

As should be apparent to one skilled in the art after reading this disclosure, the method described herein is applicable to many different forms of radio frequency communications including the above-referenced spread spectrum or multiple-access systems; carrier-based narrow band, broad band, and ultra wideband systems; and carrier-less ultra wideband systems.

It should be noted that use of the term "code" herein is slightly at variance with the terminology that appears in much of the open literature on coding. There, "code" usually refers to a set of sequences, while in the present description, "code" is used to refer to an individual sequence. A set of sequences is referred to as a "code family."

A code according to the present invention is a collection of chips, or intervals, of a certain length, the number of chips in the collection determining the length of the code sequence. Chips are given either a zero or a non-zero value with the condition that at least one chip comprising the code sequence be given a zero value. For signal generation purposes, a non-zero value is represented by the presence of transmission energy, while conversely a zero value is represented a lack of transmission energy. Chip values are preferably defined such that no two non-zero values occupy adjacent chips.

Figure 1:
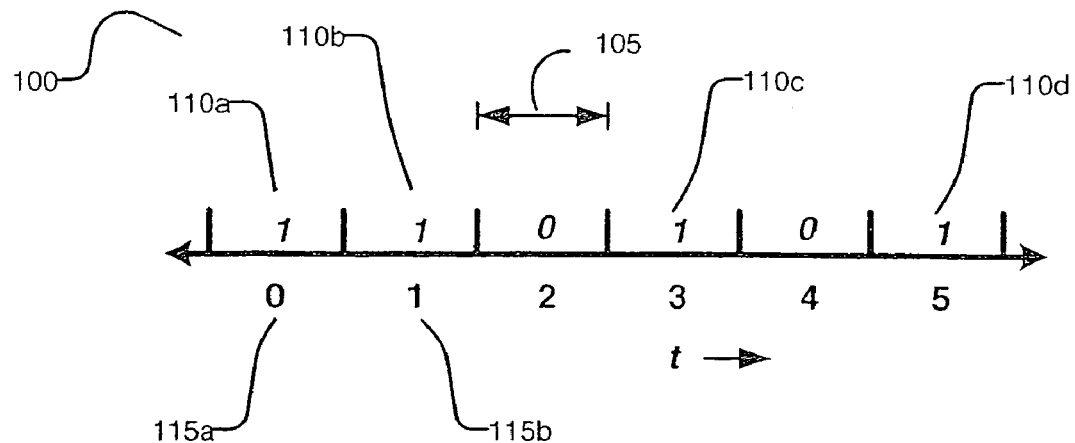
FIG. 1 is a depiction of an exemplary code sequence layout according to the present invention.

Zero and non-zero entries may be positioned within the sequence according to a ruler. A code's ruler is a template that defines the positions of non-zero values within the code, every other value being a zero value. FIG. 1 depicts a representation of an exemplary code ruler 100.

Ruler 100 is overlaid onto a sequence of chips 105, each chip being of a length, n. The length of chip 105 is typically determined primarily by the desired bandwidth of the signal and by among other things desired data rate, chipping rate, or pulse width, if a pulsed method is used. For simplicity, FIG. 1 depicts a code of length 6; in other words the code is comprised of 6 chips 105. It should be understood that this method could be used assuming any number of chips. Additionally, for illustration purposes only, ruler 100 is comprised of four non-zero values 110a-d, although the number of non-zero values comprising a ruler could be any number and is dictated by the design requirements of the system as would be understood by those skilled in the relevant art with the benefit of this description. Non-zero values 110a-d are denoted by "1", however it should be noted that the use of the numeral one is not intended to represent the amount, quantity or scalar value of 1, but merely a non-dimensional, non-zero value.

The position within ruler 100 of each non-zero value 110a-d is given by its corresponding index 115. For example, a first non-zero value 110a occurs at index 0 115a; second non-zero value 110b occurs at index 1 115b; and so on. Thus, a ruler of length n with k non-zero values can be denoted by the indices of its non-zero entries. A second dimension of information may be added by applying an amplitude pattern 200 to ruler 100, converting at least one non-zero value 115a-d to either a positive or a negative value in accordance with amplitude pattern 200. An amplitude pattern can be a set of negative and/or positive values that can be manifested in a radio wave signal in terms of amplitude, among other things.

Figure 2:
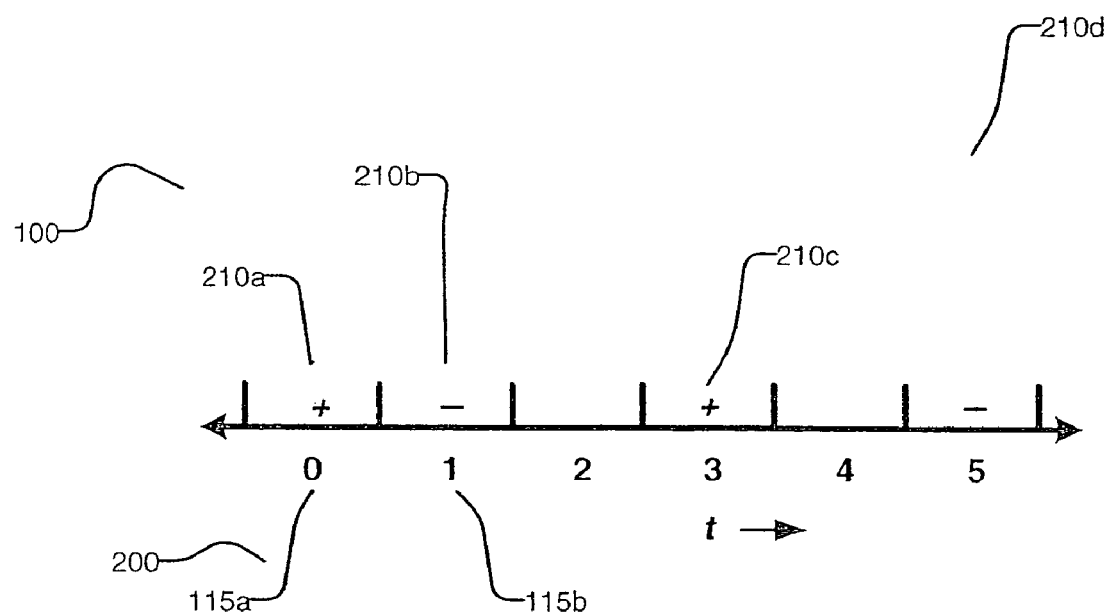
FIG. 2 is a depiction of an exemplary code sequence layout according to the present invention.

For example, in the context of impulse radio systems, an amplitude pattern may be manifested in terms of the phase, or polarity, of the pulses, where a pulse of negative polarity direction is simply 180 degrees out of phase with a pulse of positive polarity direction. In addition, an amplitude pattern can be a sequence of values of varying magnitude where the variation in magnitude is in accordance with a code. Thus, an amplitude pattern is a sequence of amplitude states expressed by phase or magnitude, or both, of an electromagnetic sinusoidal signal. FIG. 2 illustrates the result of overlaying amplitude pattern 200 onto ruler 100. Non-zero values 210a-d now take the sign according to the corresponding sign in amplitude pattern 200. Thus, ruler 100 determines the positions of the non-zero entries 110a-d of a code, while amplitude pattern 200 determine the signs of non-zero values 210a-d of a code.

Figure 3:
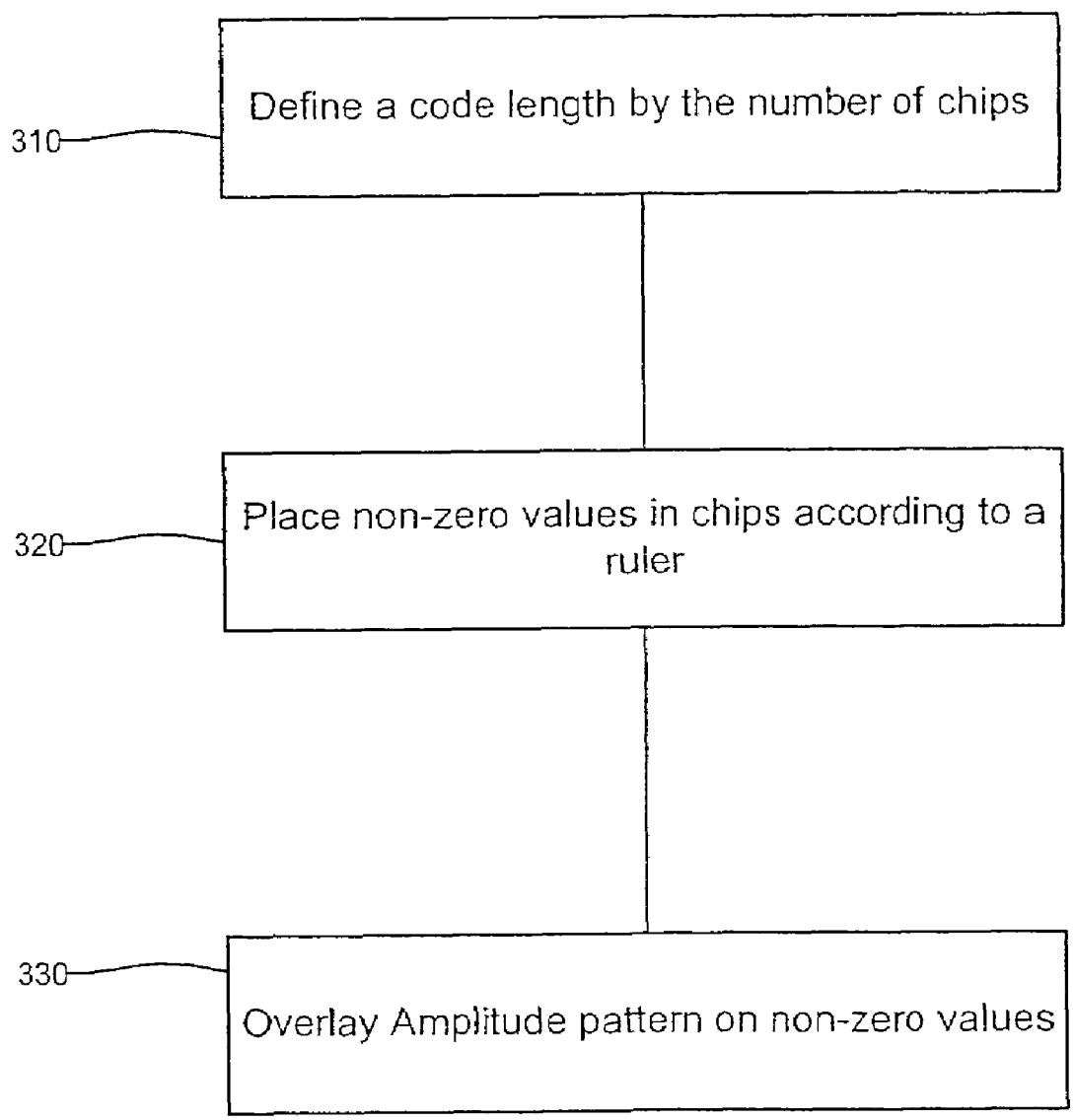
FIG. 3 is a flow diagram of the method according to one embodiment of the present invention.

With reference to FIG. 3, a code length is defined 310 and non-zero values are placed within the chips according to a ruler 320. Finally, the non-zero values are overlaid with an amplitude pattern 330.

Code Families

It is often preferable to employ many codes in communications systems operating in proximity to each other, because, among other things, multiple codes helps to mitigate mutual interference by increasing channelization. Code families may be developed incorporating basic techniques of the present invention.

Preferably, code families are constructed by separately designing rulers and amplitude patterns. There can be at least two classes of code families according to the present invention. One such class of code families is referred to herein as "single-ruler code families" because these are families in which all codes share the same ruler. It should be noted that for this process to be well defined, each amplitude pattern employed should be compatible with the ruler. For instance, if a ruler is defined by 30 chips and 4 non-zero values, a compatible amplitude pattern would contain 4 members.

Additionally, a code family may be referred to by its chip and non-zero value numbers, or "(n, k) ruler family" where n is the number of chips and k is the number of non-zero values. For example, a ruler with 30 chips and 4 non-zero values would be called a "(30, 4) ruler family."

Figure 4:
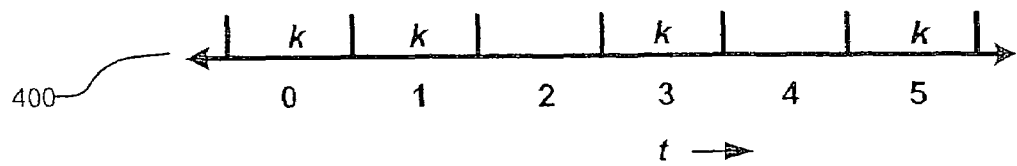
FIG. 4 depicts an exemplary ruler and exemplary amplitude pattern.
Figure 4:
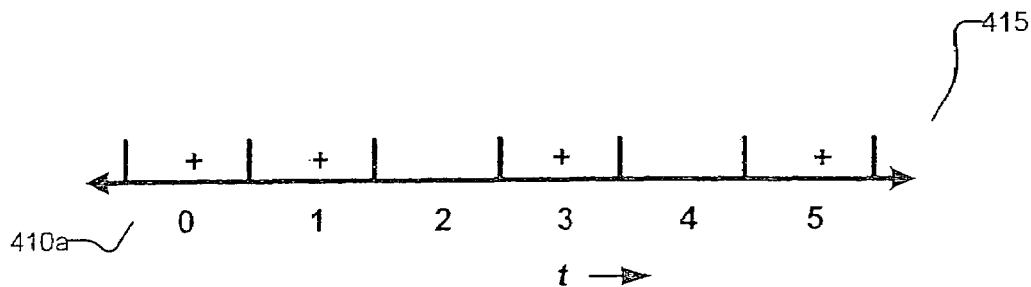
Figure 4:
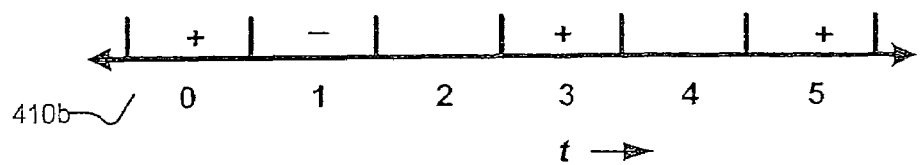
Figure 4:
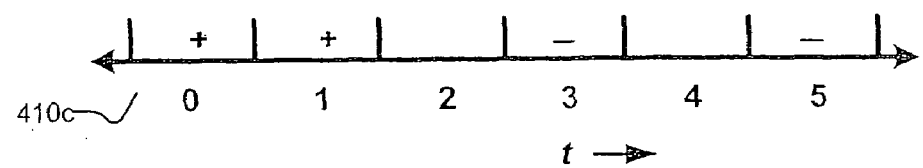
Figure 4:
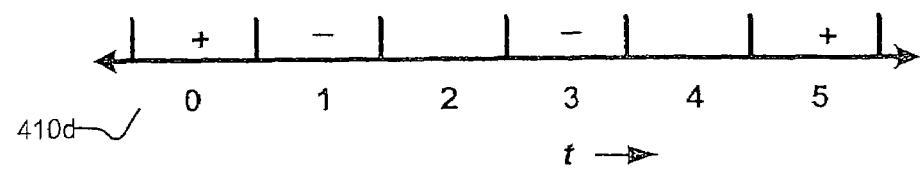

An example of a single-ruler code family is taught with reference to FIG. 4. Exemplary ruler 400, r, is 6 chips in length and contains 4 non-zero values given by $i(r)=(0, 1, 3, 5)$, where $i(r)$ is the set of indices 115 defining the positions of the non-zero values within ruler 400. Further, an exemplary family of compatible amplitude patterns 405, is P, where $P=\{p_1, p_2, p_3, p_4\}$ given by $p_1=(+1, +1, +1, +1)$ $p_2=(+1, -1, +1, -1)$ $p_3=(+1, +1, -1, -1)$ $p_4=(+1, -1, -1, +1)$ Then the code family 415 generated by overlaying each amplitude pattern 405a-d onto ruler 400 is shown in code 1 through code 4 410a-d.

Multiple-ruler code families are possible as well, in which a number of compatible ruler and amplitude pattern combinations pairs are used in order to generate codes comprising a family. To form a multiple-ruler family, each ruler from a family of rulers is overlaid with a compatible amplitude pattern from a family of amplitude patterns, and the resulting codes are conglomerated into a single code family.

Figure 5:
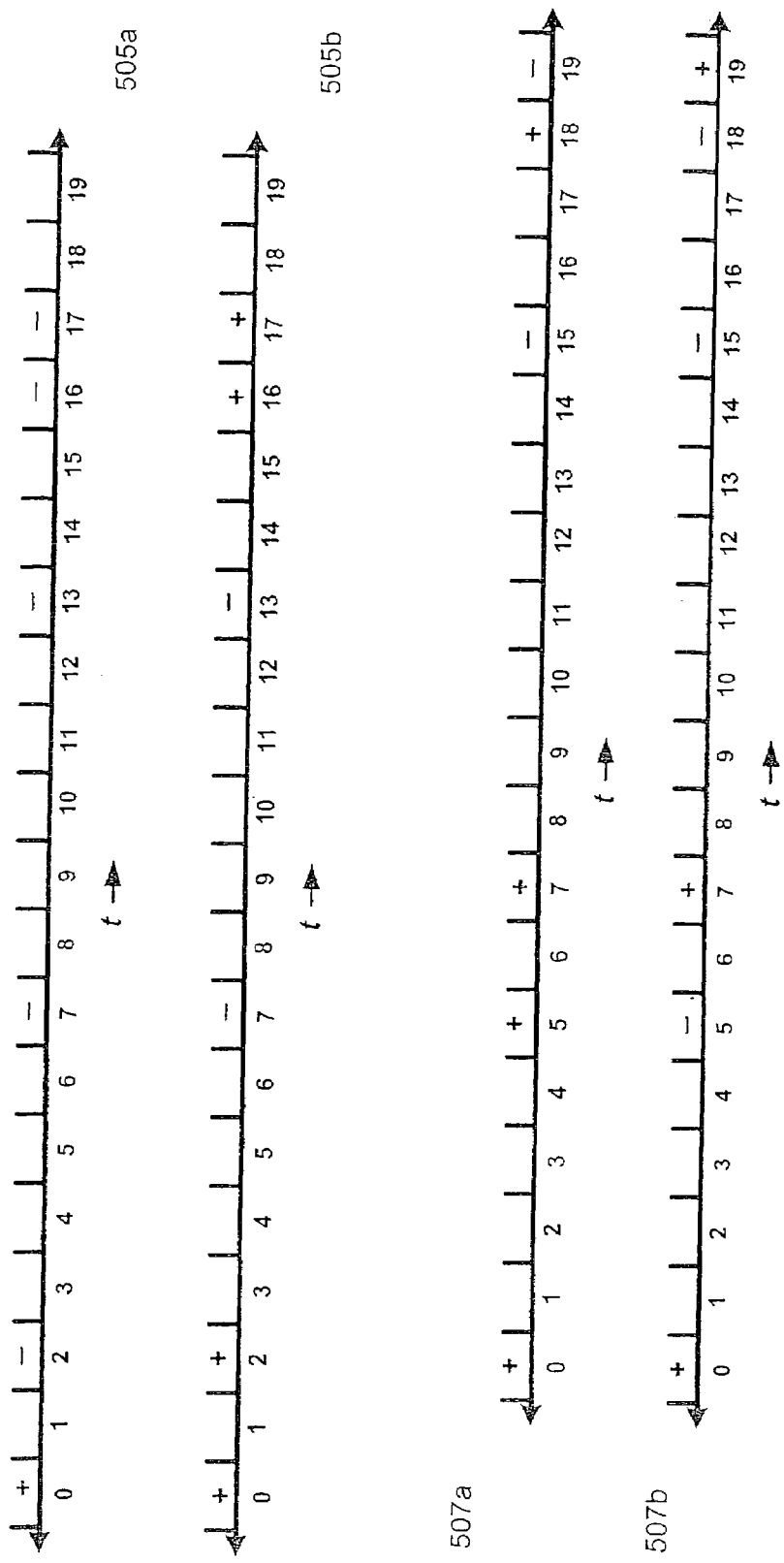
FIG. 5 depicts exemplary code sequences according to the present invention.

For example, consider exemplary ruler family comprised of two exemplary rulers, $r_1$ and $r_2$, each having 20 chips and six non-zero values where placement of non-zero values is defined as follows:

$i(r_1)=(0, 2, 7, 13, 16, 17)$, and $i(r_2)=(0, 5, 7, 15, 18, 19)$ where $i(r)$ is a set of indices of the chips comprising ruler r within which non-zero values are placed. Further consider exemplary amplitude patterns $P_1=\{p_{1,1}, p_{1,2}\}$ and $P_2=\{p_{2,1}, p_{2,2}\}$, where $P_1$ is an amplitude pattern applied to ruler $r_1$, and $P_2$ is the amplitude pattern applied to ruler, $r_2$, and where $p_{1,1}=(+1, -1, -1, -1, -1, -1)$ $p_{1,2}=(+1, +1, -1, -1, +1, +1)$ and $p_{2,1}=(+1, +1, +1, -1, +1, -1)$ $p_{2,2}=(+1, -1, +1, -1, -1, +1)$ Applying the above definitions, we obtain a multiple ruler code family represented in FIG. 5. Code 1 505a is the result of overlaying amplitude pattern $p_{1,1}$ with ruler 1; code 2 505b is the result of overlaying amplitude pattern $p_{1,2}$ with ruler $r_2$. Likewise, code 3 507a is the result of overlaying amplitude pattern $p_{2,1}$ with ruler $r_1$; and code 4 507b is the result of overlaying amplitude pattern $p_{2,2}$ with ruler $r_2$. It should be apparent that any combination of amplitude pattern with ruler could result in a code. Only four possible combinations are discussed here for clarity and brevity.

It should be noted that the present invention includes families which are constructed using multiple rulers but only one amplitude pattern and families which are constructed using amplitude pattern associated with one ruler.

Correlation Properties

Design considerations in development of communications signal codes include signal resistance to degradation due to multipath effects and to degradation of signal due to interference with a signal from another radio. The degree to which a code sequence might be subject to multipath effects may be measured by calculating the degree to which a signal correlates with a time-shifted copy of the same signal, i.e., autocorrelation. Likewise the degree to which a code sequence might be subject to interference effects may be measured by calculating the degree to which a signal correlates with a time-shifted version of another code sequence, or cross-correlation. Accordingly, the goal in code design is find or develop codes that possess desirable autocorrelation and cross-correlation properties.

The correlation function of two sequences a and b of length n is another sequence R(a, b), given by $$R(a,b)(\tau) = \frac{\sum_{i=0}^{n-1} a_i b_{i+\tau}}{\left(\sum_{i=0}^{n-1} a_i^2\right)^{1/2} \left(\sum_{i=0}^{n-1} b_i^2\right)^{1/2}}, \quad -n+1 \leq \tau \leq n-1 \quad (1)$$

It is assumed that sequence indices begin with 0. We also adopt the convention that b has been zero-padded on the left and right for indices that are less than 0 or greater than n−1. The correlation function measures the vector correlation between the sequences a and b at all possible relative shifts: $R(a, b)(\tau)$ is the cosine of the angle between the sequence a (considered as a vector), and the sequence b linearly shifted $\tau$ units to the left (again, considered as a vector). Note that the terms in the denominator are normalizing terms to account for the fact that codes a and b might have different numbers of non-zero terms.

It should be mentioned that there are variants of the above definition of the correlation function. For instance, the so-called periodic correlation function is defined by $$R_P(a, b)(\tau) = \frac{\sum_{i=0}^{n-1} a_i b_{i \oplus \tau}}{\left(\sum_{i=0}^{n-1} a_i^2\right)^{1/2} \left(\sum_{i=0}^{n-1} b_i^2\right)^{1/2}}, \quad 0 \leq \tau \leq n-1$$

where the $\oplus$ indicates addition modulo n. This has the effect of replacing the linear shift with a circular shift. Another correlation function that is useful in some cases is $$R_c(a, b) = R(a, ab),$$

where the symbol ab denotes the concatenation of codes a and b. For clarity the first definition of correlation given above will be used. However, the constructions of code families according to the present invention with desirable correlation properties will usually be valid, with slight modifications, to other correlation functions such as those defined above, as would be understood by those skilled in the art with the benefit of this description.

One observation in constructing low-crosscorrelation code families with amplitude codes, the values of which are either −1 and +1, is that the absolute value of the correlation of two codes constructed according to the present method is always less than or equal to the correlation of the corresponding rulers. The mathematical statement is $$|R(c(r_1, f_1), c(r_2, f_2))(\tau)| \leq R(r_1, r_2)(\tau) \text{ for all } \tau \quad (2)$$

The reason for this relation is not hard to see. If it is assumed, for example, that it is desired to determine the correlation of two ruler sequences, it may be assumed that a ruler contains the value of "1" in the place of the non-zero values. Thus, a ruler can be thought of as a sequence of "0"'s and "1"'s, and so correlation of two such rulers is a sum of "0"'s and "1"'s. Assuming further that amplitude patterns are overlaid on the rulers, some of the "1"'s in the sum may be changed to "−1"'s, but all of the zeros in the sum will remain zero. Thus, overlaying the amplitude patterns would only decrease the sum. In the worst case, all of the "1"'s in the correlation sum for the rulers would be changed into "−1"'s when the amplitude patterns are overlain.

Hence, the correlation of two codes constructed according to the present invention can decrease no further than to the negative of the correlation of their rulers. Notice that since this argument depends only upon the fact that the correlation function is a sum of products of code entries, Condition (2) applies to all the variant forms of the correlation function mentioned above.

As would be understood by those skilled in the relevant art, code families constructed in accordance with the present method possessed of low-correlation properties would be beneficial in implementing communication systems that move digitally encoded data. Condition (2) will now be applied to the construction of low-correlation code families constructed in accordance with the present invention. An ideal low-correlation code family, would be a family of codes that all possess the following two properties:

a) $R(c_i, c_i)(\tau) = 0$ for all non-zero $\tau$; i.e. any code from the family is orthogonal to any non-zero shift of itself, and b) $R(c_i, c_j)(\tau) = 0$ for all $\tau$ whenever $i \neq j$; i.e. any two distinct codes from the family are orthogonal to each other at all shifts.

Unfortunately, no non-trivial code family exists that satisfies both these properties simultaneously. Therefore, the next best solution is to produce families that approximate these properties as well as possible. Suppose that, instead of a) and b), a code family F satisfies the following modified conditions:

c) $|R(c_i, c_i)(\tau)| \leq \epsilon$ for all non-zero $\tau$; where $\epsilon$ is some acceptably low positive number, i.e. any code from the family F is $\epsilon$-approximately orthogonal to any non-zero shift of itself, and d) $|R(c_i, c_j)(\tau)| \leq \epsilon$ for all $\tau$ whenever $i \neq j$, where $\epsilon$ is some acceptably low positive number, i.e. any two distinct codes from the family F are $\epsilon$-approximately orthogonal to each other at all shifts.

If a code family F meets these two conditions, then the code family F is $\epsilon$-approximately shift-orthogonal. It would be understood by those skilled in the relevant art that the actual magnitude of $\epsilon$ will depend upon the requirements of a given application.

Two other concepts related to code family "shift-orthogonality" are the peak side lobe (PSL) metric $R_{PSL}$, and the integrated side lobe (ISL) metric $R_{ISL}$. The peak side lobe metric for a code family $F = \{c_1, c_2, \Lambda, c_m\}$ is defined by $$R_{PSL}(F) = \max \{R_{PSL}(c_i, c_j) : 1 \leq i, j \leq m\}$$

where $$R_{PSL}(c_i, c_j) = \max \{|R(c_i, c_j)(\tau)| : -n+1 \leq \tau \leq n-1\} \text{ for } i \neq j$$

and $$R_{PSL}(c_i, c_i) = \max \{|R(c_i, c_i)(\tau)| : -n+1 \leq \tau \leq n-1, \tau \neq 0\}$$

The integrated side lobe metric for the family F is defined by $$R_{ISL}(F) = \max\{R_{ISL}(c_i, c_j): 1 \leq i, j \leq m\}$$

where $$R_{ISL}(c_i, c_j) = \sqrt{n^{-1} \sum_{\tau=-n+1}^{n-1} [R(c_i, c_j)(\tau)]^2} \quad \text{for } i \neq j$$

and $$R_{ISL}(c_i, c_j) = \sqrt{n^{-1} \sum_{\substack{c=-n+1 \\ c \neq 0}}^{n-1} [R(c_i, c_i)(\tau)]^2} \quad \text{for } i \neq j$$

These metrics are related to the notion of $\epsilon$-approximate shift-orthogonality in the following ways:

1. The code family F is $\epsilon$-approximately shift-orthogonal if and only if $R_{PSL} \leq \epsilon$.

2. If the code family F is $\epsilon$-approximately shift-orthogonal, then $R_{ISL} \leq \epsilon$ These concepts may be beneficially applied to the present method, and specifically to the design of single-ruler code families. For example, an exemplary ruler r with n chips and k non-zero values, i.e. an (n,k) ruler, meets the condition that $$R(r; r)(\tau) \leq \epsilon \text{ for all } \tau \neq 0 \quad (3)$$

In other words, ruler r has a steeply peaked autocorrelation function. It should be noted that Condition (3) says that the one-code family R={r} consisting of just the ruler is $\epsilon$-approximately shift-orthogonal. Now, for any length amplitude pattern P={$p_1, p_2, \Lambda, p_m$} we have by Condition (2) that $$|R(c_i, c_j)(\tau)| \leq \epsilon \text{ for all } \tau \neq 0, \text{ and for all } i \text{ and } j$$

where $C_i = c(r, p_i)$ is the code generated by the ruler r and the amplitude pattern $p_i$. Thus, condition c) above is satisfied, and part of condition d) is satisfied. Remaining in condition d) is the case $\tau = 0$. Since the codes $C_i$ and $c_j$ share the same ruler, we have $$R(c_i, c_j)(0) = R(p_i, p_j)(0) = p_i \cdot p_j,$$

the ordinary dot-product of the two amplitude patterns $p_i$ and $p_j$. Therefore, if the amplitude patterns themselves are orthogonal (i.e. $p_i \cdot p_j = 0$), $$R(c_i, c_j)(0) = 0$$

and now both conditions c) and d) are fully satisfied. Thus, the family F={$c_1, c_2, \Lambda, c_m$} is $\epsilon$-approximately shift-orthogonal. Notice that the flipping amplitude patterns used in the construction do not have to be perfectly orthogonal; all that is required for $\epsilon$-approximate shift-orthogonality is that $$|p_i \cdot p_j| \leq \epsilon \text{ for all } i \neq j \quad (4)$$

Herein, amplitude patterns that satisfy condition (4) are $\epsilon$-approximately orthogonal It should be noted that it is not required that all shifts of the code sequences be approximately orthogonal, as is the case with $\epsilon$-approximate shift-orthogonality.

In summary, it can be said that to construct single-ruler code families in accordance with the present invention that possess good auto- and crosscorrelation properties it is preferred to overlay a set of $\epsilon$-approximately orthogonal amplitude sequences onto a ruler with a steeply peaked autocorrelation function. The effect is that the ruler possessing the steeply peaked auto-correlation function, with low side lobes, enhances the auto-correlation properties of the amplitude patterns when signals are offset in time.

Examples of amplitude sequences with good, correlation properties when aligned include, without limitation, Hadamard sequences, Kasami sequences, Barker sequences, Walsh sequences and Gold sequences. These or other well known orthogonal sequences may be employed as the amplitude patterns, while using an optimal Golomb ruler (OGR), for example, for the ruler as would be understood by those skilled in the relevant art with the benefit of this description.

Further, multiple ruler families may be constructed employing similar concepts. Let R={$r_1, r_2, \Lambda, r_K$} be a family of code rulers in accordance with the present invention. A family of amplitude patterns, $P_k$ may be associated with each ruler $r_k$, such that the resulting code family is $\epsilon$-approximately shift-orthogonal. It is advantageous to impose appropriate conditions on the ruler set R and the amplitude pattern P, in order to guarantee that the resulting code family is $\epsilon$-approximately shift-orthogonal. For the rulers, instead of condition (3) the following requirement may be imposed:

Ruler family R={$r_1, r_2, \Lambda, r_K$} is $\epsilon$-approximately shift-orthogonal (5)

Note that if K=1, this reduces to single-ruler condition (3) above. Each ruler $r_k \in R$ is associated with each member of amplitude pattern family $P_k = (p_{1,k}, p_{2,k}, \Lambda, p_{m_k,k})$ that is $\epsilon$-approximately orthogonal. Then by the same arguments as in the single-ruler case, condition (2) will guarantee that the resulting code family C defined as C($r_1, r_2, \ldots, r_K$; $P_1, P_2, \ldots, P_K$) is $\epsilon$-approximately shift-orthogonal. Note that the amplitude patterns associated with different rulers need not bear any relationship to one another in this construction; in fact, one could use the same amplitude pattern for all rulers. In summary, it can be said that to construct multiple-ruler code families in accordance with the present invention that possess low correlation properties it is preferred to obtain a set of rulers that form an $\epsilon$-approximately shift-orthogonal family among themselves. Then associate with each ruler an amplitude pattern, or set of amplitude patterns, that is $\epsilon$-approximately orthogonal.

An example is shown with reference to FIG. 6. Exemplary rulers $r_1$ 602 and $r_2$ 604 are 16 chips in length with non-zero positions defined as follows:

$$i(r_1) = (0, 1, 4, 10)$$

$$i(r_2) = (0, 2, 7, 15)$$

where i(r) is the set of indices of chips within which non-zero values are positioned. It can be directly verified that the ruler family R={$r_1, r_2$} is $\epsilon$-approximately shift-orthogonal, with $\epsilon = \frac{1}{4}$. Exemplary amplitude pattern family 605 P={$p_1, p_2, p_3, p_4$} is a set of length 4 Walsh-Hadamard orthogonal −1 and +1 codes, given by $$p_1 = (+1, +1, +1, +1),$$

$$p_2 = (+1, -1, +1, -1),$$

$$p_3 = (+1, +1, -1, -1),$$

$$p_4 = (+1, -1, -1, +1).$$

Note that P is $\epsilon$-approximately orthogonal, with $\epsilon = 0$. By associating each ruler 602, 604 with each amplitude pattern within amplitude pattern family 605, code family 610 is obtained. Code family 610 is an eight-code family that is $\epsilon$-approximately shift-orthogonal, again with $\epsilon = \frac{1}{4}$.

Figure 6A:
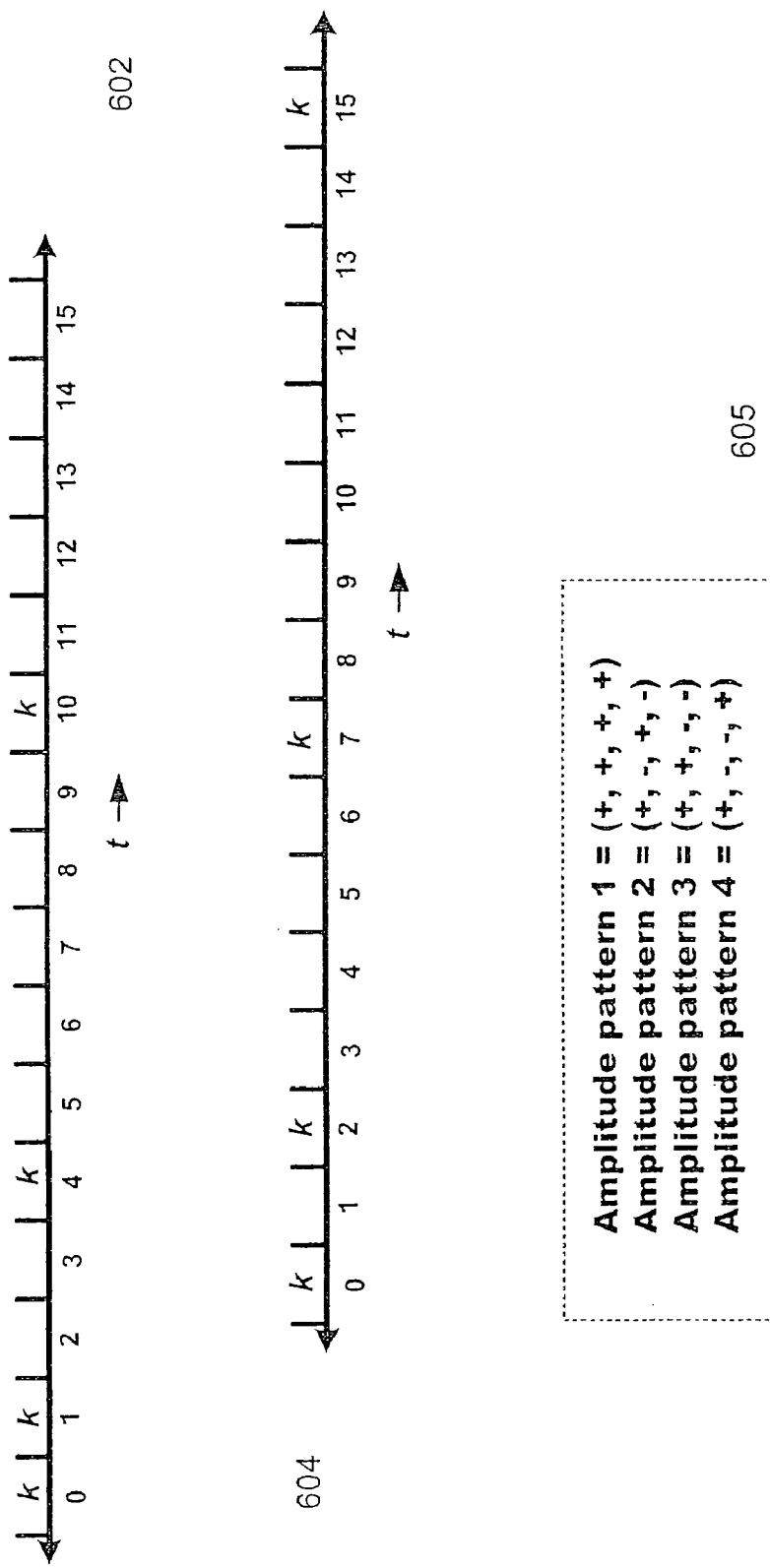
FIG. 6A depicts an exemplary family of rulers and an exemplary family or amplitude patterns according to the present invention.
Figure 6B:
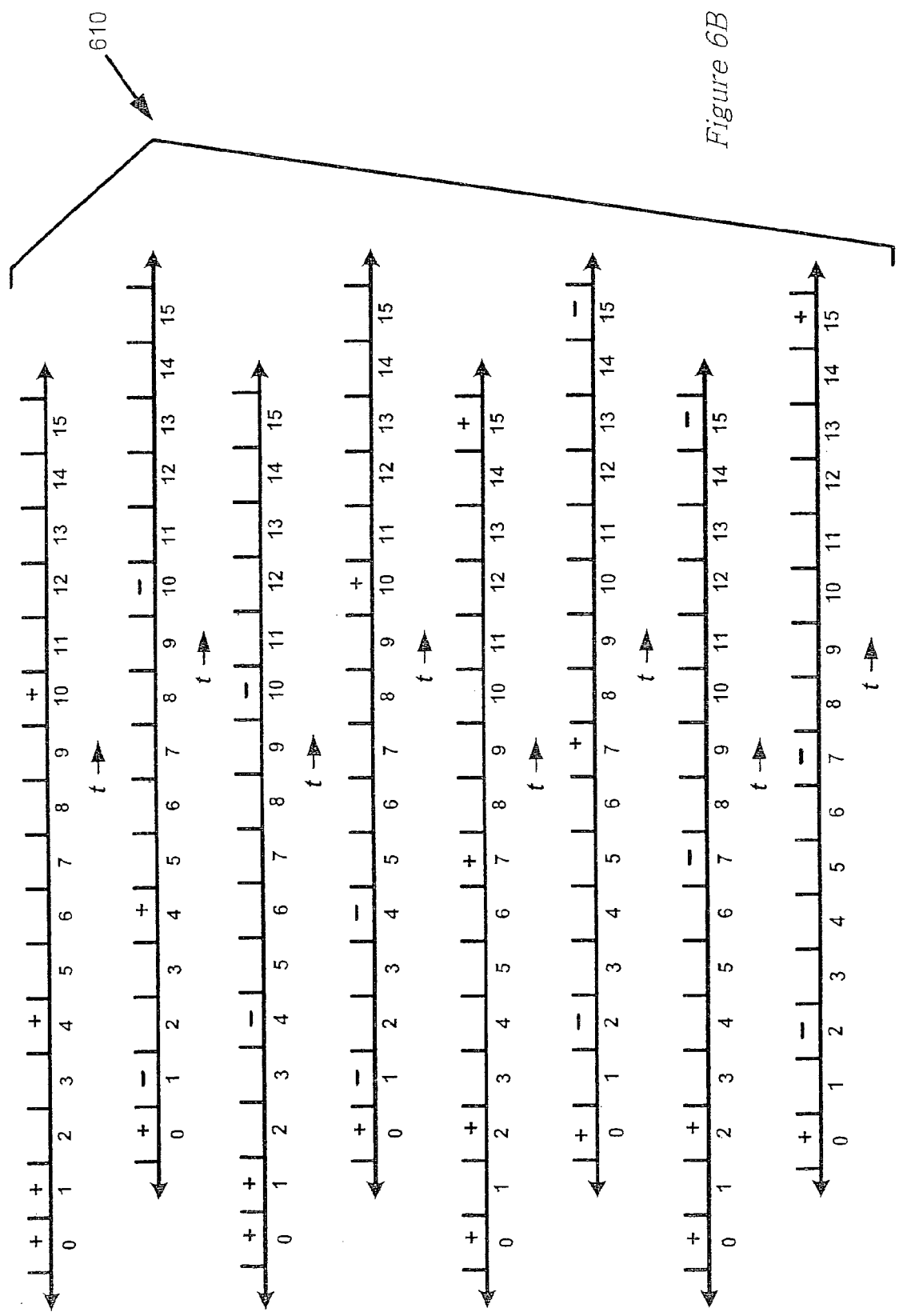
FIG. 6B depicts an exemplary code sequences according to the present invention.
Figure 6C:
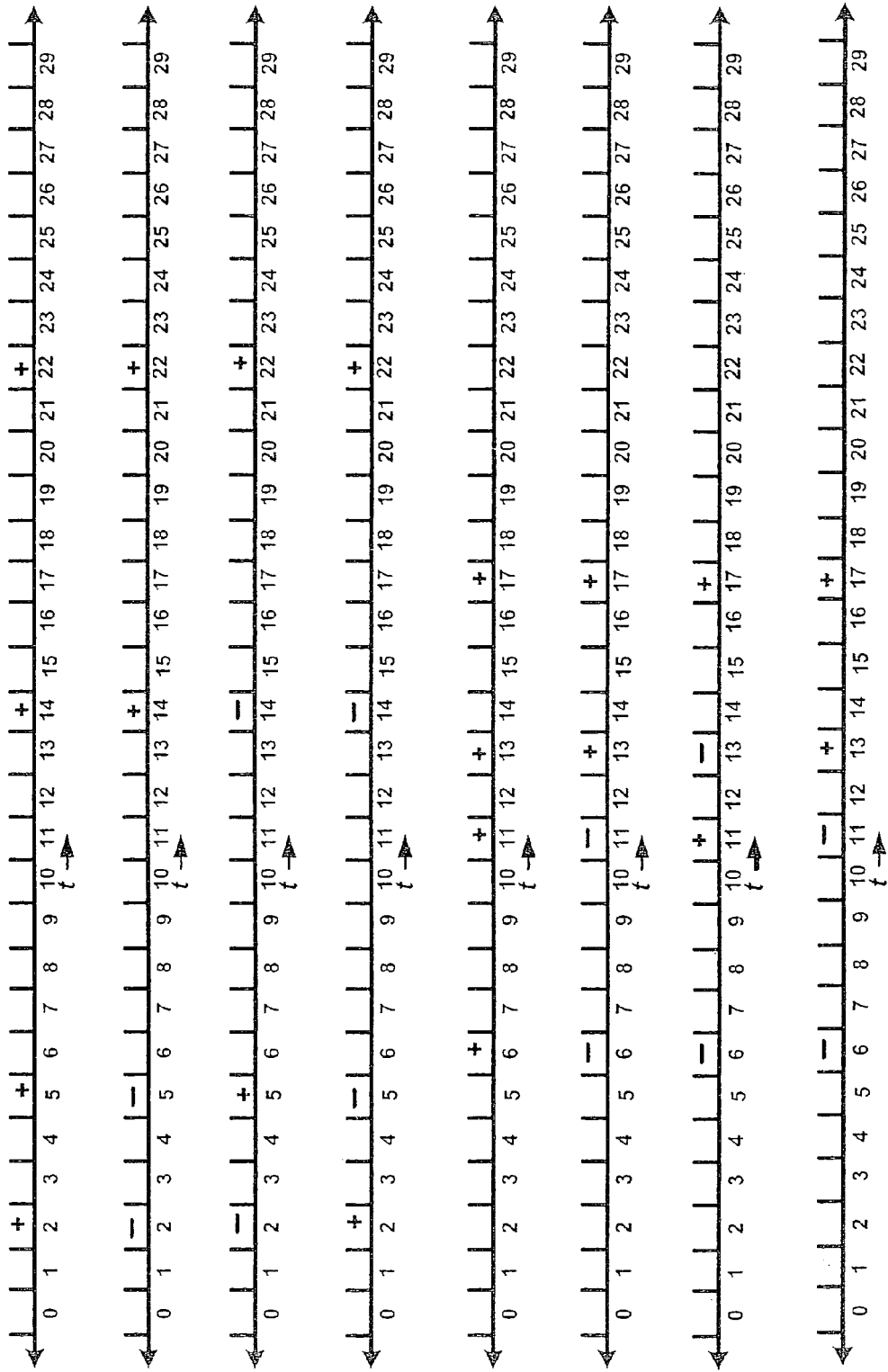
FIG. 6C depicts a (30, 4) code family according to the present invention.

A further example is discussed with reference to FIG. 6C where exemplary rulers $r_1$ 622 and $r_2$ 624 are 30 chips in length with non-zero positions defined as follows:

$$i(r_1) = (3, 6, 15, 23)$$

$$i(r_2) = (7, 12, 14, 18)$$

where i(r) is the set of indices of chips within which non-zero values are positioned. Exemplary amplitude pattern family 625 P={$p_1, p_2, p_3, p_4$} is a set of length 4 Walsh-Hadamard orthogonal −1 and +1 codes, given by $$p_1 = (+1, +1, +1, +1),$$

$$p_2 = (-1, -1, +1, +1),$$

$$p_3 = (-1, +1, +1, -1),$$

$$p_4 = (+1, -1, +1, -1).$$

The resulting code family displays excellent autocorrelation and cross-correlation properties.

It should be noted that in this (30, 4) ruler family, the rulers are designed such that no non-zero values will be placed in chips occurring after at most the 23$^{rd}$ chip 627. It is preferable when using the codes where each code sequence is a symbol to design rulers such that all of the non-zero values occur as close to the start of the sequence as possible. The lack of non-zero values, or energy, in the latter chips allows a longer time for the system to perform symbol decoding tasks such as sample and hold, data transfer and pipe line advancing, also known as "symbol house-keeping." The choice of the chip after which non-zero values will not occur is a design choice based upon symbol length, chip width, and system speed.

Other Methods of Generation

It should be noted that while the design rules given above provide sufficient conditions for generating low-correlation code families according to the present invention, these conditions are not necessary. In fact, exemplary code family 610 is a case in point. Code family 610 is $\epsilon$-approximately shift-orthogonal, with $\epsilon=\frac{1}{6}$, but the set of rulers is not. Thus, the design rules given above are not the only methods by which low-correlation code families according to the present invention may be produced.

Search by computer is another method that can be used to generate code families with desirable correlation properties. However, as the length n and number of non-zero pulses k get larger, the number of (n,k)-codes quickly enlarges. In fact, there are precisely $$\binom{n}{k} 2^k$$

(n,k)-codes, so an exhaustive search technique using even the fastest computers is only feasible for relatively small values of n and k.

Applicants have found through both methods of generation that the (30, 4) ruler family described above appears to be the multiple ruler family with the shortest sequence. For this reason, the (30, 4) appears to be particularly advantageous when employing a scheme in which the entire code sequence is used as a symbol because symbol times are shorter. Symbols could be transmitted at a higher rate which contributes to increased data throughput while at the same time providing increased channelization and resistance to multipath interference. Applicants have developed the (30, 4) family of code sequences using two rulers and four amplitude patterns according to the present invention. FIG. 6C depicts a typical two-ruler (30, 4) code family.

Figure 6D:
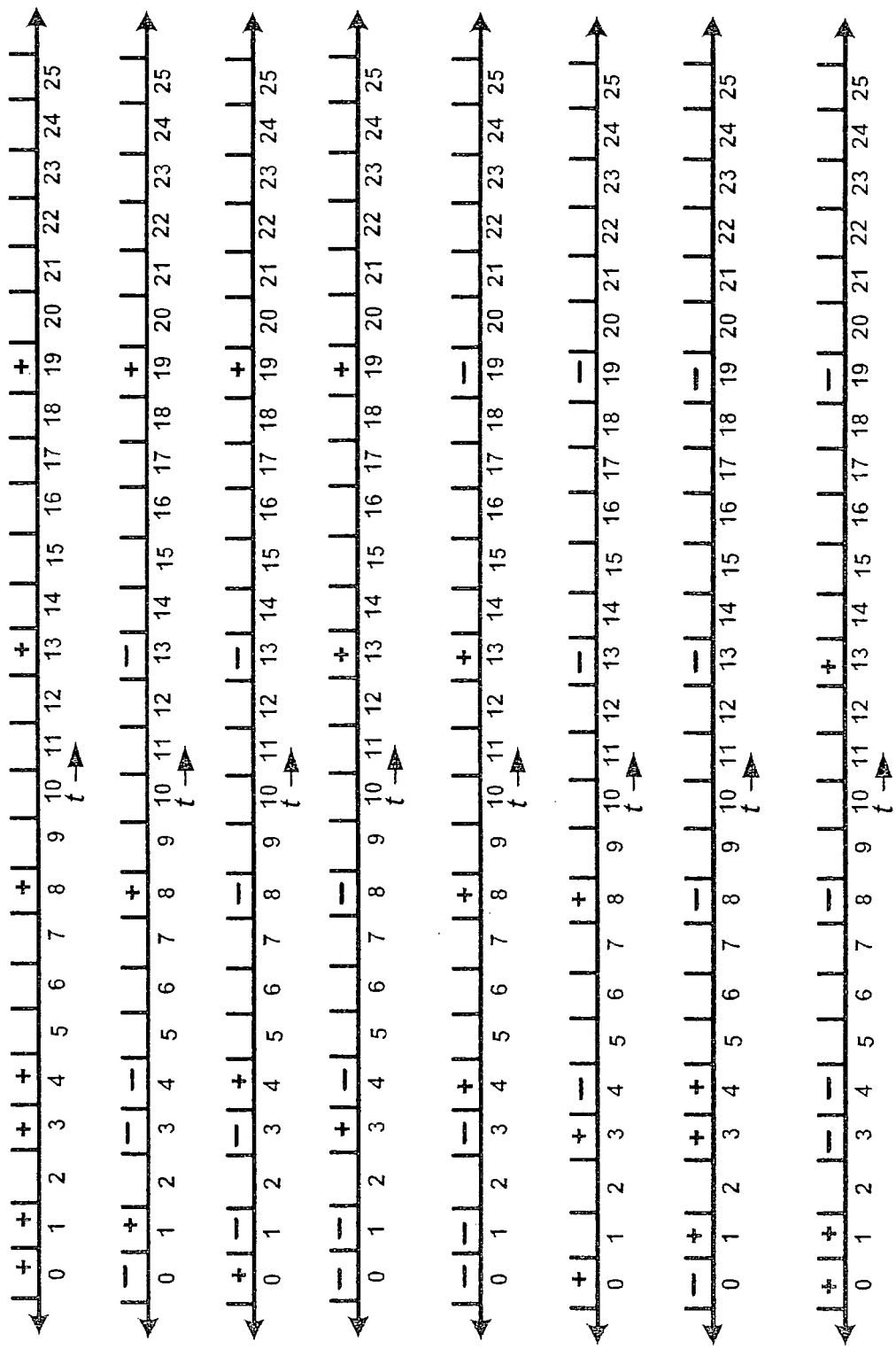
FIG. 6D depicts a (26, 7) code family according to the present invention.

Additionally, the single ruler family (26, 7) appears to be the shortest single ruler sequence. The (26, 7) code family has been developed using a single ruler and eight amplitude patterns according to the present invention yielding eight code sequences. FIG. 6D depicts a typical (26, 7) code family.

Exemplary Apparatus for Use

An apparatus for use of such a code is discussed with reference to FIGS. 7 and 8. The apparatus shown relates to an ultra wideband radio system; however, it should be noted that systems comprising other RF technologies could be designed to employ the methods described above as would be understood by those skilled in the art.

In the apparatus described herein below, non-zero values can be represented by the presence of an ultra wideband impulse, as defined above, while zero values can be represented by absence of an ultra wideband impulse. A bi-phase amplitude pattern can be represented by the inversion of a pulse relative to another, also known as "flip modulation," as described in co-owned and co-pending U.S. application Ser. No. 9/537,692 entitled "Apparatus, System and Method for Flip Modulation in an Impulse Radio Communications System" filed Mar. 29, 2000, which is incorporated by reference herein.

Transmitter

Figure 7:
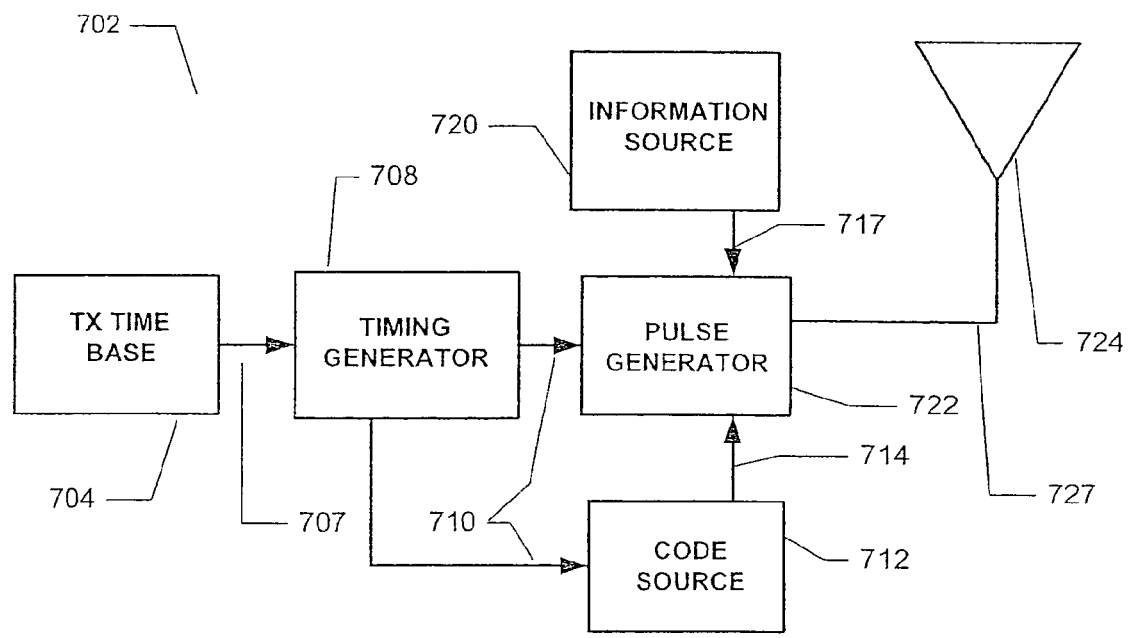
FIG. 7 is a functional diagram of an exemplary impulse radio transmitter.

Referring to FIG. 7, an exemplary embodiment of an impulse radio transmitter 702 of an impulse radio communication system having one subcarrier channel that advantageously employs the above-described invention is shown.

The transmitter 702 comprises a time base 704 that generates a periodic timing signal 707. The time base 704 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 707 is supplied to a timing generator 708.

The timing generator 708 supplies synchronizing signals 710 to the code source 712 and utilizes the code source output 714 together with an internally generated subcarrier signal (which is optional) and an information signal 717 to generate a modulated, coded timing signal 718.

The code source 712 comprises a storage device such as a random access memory (RAM), read only memory (ROM), or the like, for storing suitable codes and for outputting the codes as a code signal 714.

An information source 720 supplies the information signal 717 to the timing generator 708. The information signal 717 can be any type of intelligence, including digital bits representing voice, data, imagery, or the like, analog signals, or complex signals.

A pulse generator 722 uses the modulated, coded timing signal 718 as a trigger to generate output pulses. The output pulses are sent to a transmit antenna 724 via a transmission line 727 coupled thereto. The output pulses are converted into propagating electromagnetic pulses by the transmit antenna 724. In the present embodiment, the electromagnetic pulses are called the emitted signal, and propagate to an impulse radio receiver 802, such as shown in FIG. 8, through a propagation medium, such as air, in a radio frequency embodiment. In a preferred embodiment, the emitted signal is wide-band or ultra wideband, approaching a monocycle pulse.

However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

FIG. 8 shows an exemplary embodiment of an impulse radio receiver 802 (hereinafter called the receiver) for the impulse radio communication system that may be used in connection with the present invention. More specifically, the system illustrated in FIG. 8 is for reception of digital data wherein one or more pulses are transmitted for each data bit.

The receiver 802 comprises a receive antenna 804 for receiving a propagated impulse radio signal 807. A received signal 808 from the receive antenna 804 is coupled to a cross correlator or sampler 810 to produce a baseband output 812. The cross correlator or sampler 810 includes multiply and integrate functions together with any necessary filters to optimize signal to noise ratio.

The receiver 802 also includes a timing generator 814, which receives a periodic timing signal 817 from a receiver time base 818. This time base 818 is adjustable and controllable in time, frequency, or phase, as required by the lock loop in order to lock on the received signal 808. The timing generator 814 provides synchronizing signals 820 to the code source 822 and receives a code control signal 824 from the code source 822. The timing generator 814 utilizes the periodic timing signal 817 and code control signal 824 to produce a coded timing signal 827.

In the present invention, coded timing signal provides information regarding the ruler used in the code sequence to be received. The template generator 828 is triggered by this coded timing signal 827 and produces a train of template signal pulses 830 ideally having waveforms substantially equivalent to each pulse of the received signal 808. The code for receiving a given signal is the same code utilized by the originating transmitter 702 to generate the propagated signal 807. Thus, the timing of the template pulse train 830 matches the timing of the received signal pulse train 808, allowing the received signal 808 to be synchronously sampled in the correlator 810. The correlator 810 ideally comprises a multiplier followed by a short-term integrator to sum the multiplier product over the pulse interval.

Further examples and details of correlation and sampling processes can be found in commonly owned U.S. Pat. Nos. 4,641,317, 4,743,906, 4,813,057, and 4,979,186, which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 810, also called a baseband signal 812, can be coupled to an optional subcarrier demodulator (not shown), which demodulates the subcarrier information signal from the subcarrier. The purpose of the optional subcarrier process, when used, is to move the information signal away from DC (zero frequency) to improve immunity to low frequency noise and offsets.

The baseband signal 812 or the output of the subcarrier demodulator, if used, is then sent to a first demodulation stage 834. The demodulation stage is comprised of a plurality of pulse summers 852a-d, also known as "ramp-builders".

The baseband signal 812 is conducted to each of the summers 852a-d. A code control signal 858 is sent to each summer 852a-d from code source 822. The output of each summer 852a-d is sent to a second demodulation stage 862.

The baseband signal 812 is also input to a lowpass filter 842 (also referred to as lock loop filter 842). A control loop comprising the lowpass filter 842, time base 818, timing generator 814, template generator 828, and correlator 810 is used to generate a filtered error signal 844. The filtered error signal 844 provides adjustments to the adjustable time base 818 to time position the periodic timing signal 827 in relation to the position of the received signal 808. In a transceiver embodiment, substantial economy can be achieved by sharing part or all of several of the functions of the transmitter 702 and receiver 802. Some of these include the time base 818, timing generator 814, code source 822, antenna 804, and the like.

There can be at least two methods of operation. Assume a code family is comprised of eight codes using two rulers and a family of four Walsh codes as the amplitude pattern. First, the codes sequences may be used to provide channelization between 8 networks of co-located simultaneously operating radios, where each of the eight code sequences is assigned to a different set (network) of communicating radios. Further assume that only one code sequence within the eight-code family is used by receiver 802. During conversion to baseband, the code sequence's ruler pattern is matched by coded timing signal 827 derived from code source 822. No other ruler pattern will be allowed to proceed to first demodulation stage 834. Baseband signal 812 is sent to first demodulation stage 834 wherein one summer 852b, for example, is controlled to add pulses according to the code sequence's amplitude pattern. All other summers are not activated.

A second method may be used to improve the data throughput of the communication signal. For this case, all of the radios are assumed to be in the same network. Assume that all eight code sequences may be received by receiver 802 and that each code sequence represents a data state or symbol. Again, coded timing signal 827 is used to detect the appropriate ruler for a given code sequence. The first demodulation stage will now have two groups of summers with a group for each ruler and four summers per group. Baseband signal 812 is sent to all eight summers 852a-d which also receive code control signals from code source 822 in accordance with an enable associated with the active ruler as well as one of four amplitude patterns. The symbol transmitted at a given time will be represented by the greatest amount of energy represented by a summer 852a-h. The output of each summer 852a-h is sent to second stage demodulation which selects the symbol transmitted based upon the greatest amplitude (representing captured energy) accumulated by a summer 852a-h. In this instance, the winner of the 8-way amplitude sort will determine 8 bits of demodulated data. Additionally, the entire code sequence can be flipped or quadrature-shifted to carry two more bits.

As would be apparent to one skilled in the art, the 8 codes can be used to provide eight independent channels, each of relatively modest data carrying capability, or all 8 codes can be used to provide a single channel with very significant data carrying capability, or any number of other combinations in the middle. For example, 2 channels using 4 codes each, or 4 channels using 2 codes each.

Other Radio Systems

As would be understood by those skilled in the relevant art, the above-described method can be advantageously employed in a wide variety of communications systems, including carrier-type narrow band and broadband systems. Those skilled in the art will recognize the non-zero values of the chips can be represented by the presence of carrier energy, while the zero values are represented by a lack of energy within a given chip.

In a similar fashion the above-described method could be used in another form of UWB radio, employing what is known as a multi-band technique. One version of a multi-band UWB radio uses a UWB pulse to pulse-gate or time-gate a sinusoidal carrier thereby producing a UWB pulsed carrier; similar to what is described in Larrick, U.S. Pat. No. 6,026,125. The frequency of the carrier signal is then varied on a pulse-by-pulse basis, the possible frequencies of the carrier being subdivisions of the available UWB spectrum. Another way to achieve a multi-band effect is to envelope the carrier with a sinusoidal wave of appropriate frequency to output a UWB enveloped carrier. Again the carrier frequency may be varied on a pulse-by-pulse basis, the possible frequencies of the carrier being subdivisions of the available UWB spectrum. The coding method described above could be implemented by energizing the carrier generator at appropriate times to control the presence or absence of energy in the code.

Methods of Use

The code sequences may be used where information is carried in each of the pulses and recovered on a pulse-by-pulse basis. However, if instead of a single pulse, the signal is a coded sequence of pulses and the sequence code is such that it has a low autocorrelation function, then the very definition of autocorrelation says that the signal is not corrupted by delayed versions of itself, except when the delay corresponds exactly to the length of the sequence. The discussion above suggests a strategy where families of codes are found which all have good autocorrelation properties to mitigate the multipath problem, and the codes all have good cross correlation properties with all other codes. This would allow as many uncoordinated channels as there are codes.

The data carrying capacity of each channel would be determined by the number of ways the basic coded sequence being used by that channel can be modulated. For example, the basic sequence might be inverted or not to carry information, or it might be shifted in time or not shifted to carry information. The amplitude of the code might be varied to carry information. All of these things might be done at once.

CONCLUSION

As described above and shown in the associated drawings, the present invention comprises a method for generating communications signal sequences and a system for using such signal sequences. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method of generating communication signals comprising the steps of:
    selecting a code length, said code length comprising a plurality of chips, wherein each chip of said plurality of chips is one of a nonzero value and a zero value, wherein said non-zero value is one of a positive value and a negative value and wherein said positive value and said negative value correspond to an amplitude of an impulse and wherein said chips are arrayed such that no two of said non-zero values are adjacent;
    arraying said plurality of chips such that there is a plurality of said zero values within said plurality of chips and one or more said non-zero values is arrayed in accordance with a ruler, wherein said ruler is substantially orthogonal to time-shifted versions of said ruler and belonging to a family of rulers wherein each ruler within said family is substantially orthogonal to each other ruler within said family of rulers;
    arraying said plurality of chips such that said at least one positive value and said at least one negative value are placed in accordance with a pattern, said pattern being from a family of binary patterns wherein each pattern within said family of binary patterns is substantially orthogonal to substantially all time-shifted versions of each other pattern within said family of binary patterns;
    using the arrayed chips to generate a signal; and
    transmitting the generated signal.

2. A method for generating a set of communication signal sequences comprising the steps of:
    defining said set such that all of said communications signal sequences in said set have a code length, said code length comprising a plurality of chips, each of said chips having a value, said value being one of a positive value, a negative value and a zero value, wherein said positive value and said negative value correspond to an initial direction of an impulse;
    arraying said chips such that at least one said positive value and at least one said negative value is placed in accordance with a ruler, said ruler being substantially orthogonal to all time-shifted versions of said ruler and belonging to a family of rulers wherein each ruler within said family is substantially orthogonal to each other ruler within said family of rulers, and arraying said chips such that at least one of said chips has a zero value;
    arraying said chips such that said at least one positive value and said at least one negative value are placed in accordance with a pattern, said pattern being from a family of binary patterns wherein each pattern within said family of binary patterns is substantially orthogonal to substantially all time-shifted versions of each other pattern within said family of binary patterns;
    arraying said chips such that no two of said non-zero values are adjacent;
    using the arrayed chips to generate a signal; and
    transmitting the generated signal.

3. The method according to claim 2, wherein said code length is 30 chips.

4. The method according to claim 3, wherein said family of rulers comprises a first ruler and a second ruler where said first ruler and said second ruler comprise four non-zero value chips.

5. The method according to claim 4, wherein said family of binary patterns is comprised of four patterns.

6. A radio communication system comprising:
    a radio transmitter; and
    a radio receiver,
        said radio transmitter and said radio receiver employing a communications signal having a code length, said code length comprising a plurality of chips, wherein each chip of said plurality of chips is one of a non-zero value and a zero value, and wherein said chips are arrayed such that there is a plurality of zero values within said plurality of chips, no two of said non-zero values are adjacent and one or more said non-zero values is arrayed in accordance with a ruler, wherein said ruler is substantially orthogonal to time-shifted versions of said ruler and wherein said non-zero value is one of a positive value and a negative value and wherein said positive value and said negative value correspond to an amplitude of an impulse and wherein arraying said plurality of chips further comprises arraying at least one said positive value and at least one said negative value in accordance with a pattern selected from a family of patterns, wherein said family of patterns is such that any pattern within said family of patterns is substantially orthogonal to substantially all time-shifted versions of any other pattern within said family of patterns; and wherein the radio transmitter employs the communications signal to generate and transmit a transmission signal.

7. A method of generating communication signals comprising the steps of:
    selecting a code length, said code length comprising a plurality of chips, wherein each chip of said plurality of chips is one of a nonzero value and a zero value, wherein said non-zero value is one of a positive value and a negative value;
    arraying said plurality of chips such that there is a plurality of said zero values within said plurality of chips and one or more said non-zero values is arrayed in accordance with a ruler, wherein said ruler is substantially orthogonal to all time-shifted versions of said ruler;
    arraying at least one said positive value and at least one said negative value in accordance with a pattern, wherein said pattern is selected from a family of patterns, wherein any pattern within said family of patterns is substantially orthogonal to substantially all time-shifted versions of any other pattern within said family of patterns;

arraying said plurality of chips such that no two of said non-zero values are adjacent;

using the arrayed plurality of chips to generate a signal; and transmitting the generated signal.

8. The method according to claim 7, wherein said positive value and said negative value correspond to an amplitude of an impulse.

9. A method of generating communication signals comprising the steps of:

selecting a code length, said code length comprising a plurality of chips, wherein each chip of said plurality of chips is one of a nonzero value and a zero value, wherein said non-zero value is one of a positive value and a negative value;

arraying said plurality of chips wherein:

there is a plurality of said zero values within said plurality of chips and one or more said non-zero values is arrayed in accordance with a ruler, wherein said ruler belongs to a family of rulers wherein any ruler within said family of rulers is substantially orthogonal to all time-shifted versions of any other ruler within said family of rulers;

at least one said positive value and at least one said negative value are in accordance with a pattern, wherein said pattern is selected from a family of patterns and wherein said family of patterns is such that any pattern within said family of patterns is substantially orthogonal to substantially all time-shifted versions of any other pattern within said family of patterns; and no two of said non-zero values are adjacent;

using the arrayed chips to generate a signal; and transmitting the generated signal.

10. The method according to claim 9, wherein said positive value and said negative value correspond to an amplitude of an impulse.

11. A radio communication system comprising:

a radio transmitter; and a radio receiver, said radio transmitter and said radio receiver employing a communications signal having a code length, said code length comprising a plurality of chips, wherein each chip of said plurality of chips is one of a non-zero value and a zero value, wherein said non-zero value is one of a positive value and a negative value and wherein said positive value and said negative value correspond to an amplitude of an impulse and wherein said chips are arrayed such that there is a plurality of zero values within said plurality of chips, at least one said positive value and at least one said negative value is arrayed in accordance with a pattern selected from a family of patterns wherein any pattern within said family of patterns is substantially orthogonal to substantially all time-shifted versions of any other pattern within said family of patterns, and one or more said non-zero values is arrayed in accordance with a ruler, wherein said ruler is substantially orthogonal to all time-shifted versions of said ruler; and wherein the radio transmitter employs the communications signal to generate and transmit a transmission signal.

12. The radio communication system of claim 11, wherein said values are arrayed such that no two of said non-zero values are adjacent.

13. A radio communication system comprising:

a radio transmitter; and a radio receiver, said radio transmitter and said radio receiver employing a communications signal having a code length, said code length comprising a plurality of chips, wherein each chip of said plurality of chips is one of a non-zero value and a zero value, wherein said non-zero value is one of a positive value and a negative value and wherein said positive value and said negative value correspond to an amplitude of an impulse and wherein said chips are arrayed such that there is a plurality of zero values within said plurality of chips and one or more said non-zero values is arrayed in accordance with a ruler, wherein said ruler belongs to a family of rulers wherein any ruler within said family of rulers is substantially orthogonal to all time-shifted versions of any other ruler within said family of rulers and wherein arraying said plurality of chips further comprises arraying at least one said positive value and at least one said negative value in accordance with a pattern selected from a family of patterns, wherein said family of patterns is such that any pattern within said family of patterns is substantially orthogonal to substantially all time-shifted versions of any other pattern within said family of patterns; and wherein the radio transmitter employs the communications signal to generate and transmit a transmission signal.

14. The radio communication system of claim 13, wherein said values are arrayed such that no two of said non-zero values are adjacent.

* * * * *

UNITED STATES PATENT AND TRADEMARK OFFICE
CERTIFICATE OF CORRECTION

| | |
|---|---|
| PATENT NO. | : 7,400,666 B2 |
| APPLICATION NO. | : 10/616118 |
| DATED | : July 15, 2008 |
| INVENTOR(S) | : Vernon R. Brethour et al. |

It is certified that error appears in the above-identified patent and that said Letters Patent is hereby corrected as shown below:

On the Title Page (54) and column 1, line 5:

Please replace the word "Game" with the word --Same--.

Signed and Sealed this

Twenty-third Day of September, 2008

JON W. DUDAS
*Director of the United States Patent and Trademark Office*